2,890,117

QUICK COOKING CEREAL AND METHOD OF FORMING SAME

Sidney M. Cantor, Overbrook Hills, Pa., and Lucille Faller and Bernard Wolnak, Chicago, Ill., assignors to John S. Campbell, Minneapolis, Minn.

No Drawing. Application October 17, 1956
Serial No. 616,378

14 Claims. (Cl. 99—83)

The present invention relates generally to foodstuffs, such as cereals, and more particularly to so-called quick-cooking farina type cereals which require reduced cooking time.

The cooking of cereal products involves at least two principal factors, namely gelatinization of the starch granules plus hydration and/or denaturation of the proteins. Gelatinization involves the swelling or expansion of the envelopes containing the starch carbohydrate with or without actual breaking open of the particles. Such envelopes as are left swollen but unbroken during cooking are, of course, broken during digestion when the cereal has been eaten. Hydration and/or denaturation of the cereal proteins results in opening up of the protein chains and renders the proteins more digestible.

While cooking thus increases digestibility through gelatinization as well as hydration and/or denaturation of the proteins, it has a further and equally important effect, namely developing in cereal products the organoleptic properties of taste, texture, flavor, mouth feel, etc. which have come to be associated with cooked cereal products.

The development of desirable organoleptic properties, giving the final product the mouth feel, flavor, etc. normally associated with conventional cooked cereals is perhaps an even more important result than maximum increase of digestibility, in the case of farina type cereal products, since the body is perfectly capable of digesting such products, even though only partially cooked, whereas a product which does not taste "right" or is unpalatable is rejected even though fully digestible. For example, steel cut oats, which require a half hour or more of cooking, are still preferred by many people over pre-cooked rolled oats, which require only 3 to 5 minutes of cooking, because of their superior flavor, mouth feel and consistency, despite the added bother of preparation.

Conventional so-called pre-cooked cereals are all treated by steaming, passing over heated rolls, or exploding in a moist heated atmosphere or in a vacuum, after which they are usually dried and packaged. This, in effect achieves a comparable degree of gelatinization and hydration and/or denaturation in the packaged pre-cooked "instant" cereals, as is accomplished by conventional cooking of ordinary "hot" cereals. Thus, the "instant" cereals, when mixed with cold water or milk, are just as digestible, as to gelatinization and hydration and/ or denaturation, as their cooked hot counterparts. However, these conventional pre-cooking operations, as used in the preparation of cold instant cereals, markedly change the mouth feel, flavor, consistency and other organoleptic properties normally associated with conventional cereals which require extended cooking by the housewife and are served hot.

Instant cereals (i.e., those which can be mixed with cold milk and served without any heating) as well as quick-cooking cereals (which still require cooking but for a time considerably less than originally was needed) derive their popularity from convenience of preparation and despite the fact that their flavor, mouth feel, consistency, etc. have been considerably altered from those associated with the original untreated cereal.

It has long been the industry's hope, heretofore unrealized, to develop a farina type cereal product which would be quick-cooking (i.e., requiring only a fraction of the normal cooking time) and which, at the same time, would have the desirable flavor, mouth feel, consistency and other organoleptic properties of ordinary untreated slow-cooking farina.

Accordingly, it is an object of the present invention to provide a new and useful farina type cereal, as well as a method of producing the same, which will "cook" in a fraction of the time ordinarily required, in an appreciably smaller proportion of water or milk, which has a lesser tendency to lump or to cake in the cooking utensil, and which is substantially identical to ordinary slow-cooking farina type cereals in mouth feel, flavor, consistency and other organoleptic properties, as well as in physical appearance. Other objects and advantages of the present invention are apparent in the following description and appended claims.

In accordance with the present invention, it is possible to obtain a farina type cereal product which will "cook" in as little as a half-minute or less, which requires one-third to one-half less water during cooking, which has appreciably lesser tendency to lump or cake in the cooking utensil, and which, when prepared, is substantially indistinguishable from slow-cooked conventional farina in physical appearance, as well as in mouth feel, flavor, texture, consistency and other organoleptic properties.

Generally speaking, these results are achieved by incorporating into the conventional farina type cereal a minor proportion of one or more of certain surface active proteins capable of hydrating, specifically vital gluten, the vital glutenin fraction of gluten, milk solids, soybean flour, and hydratable casein salts such as sodium caseinate.

The surface active hydratable protein additive is preferably incorporated into the dry-milled farina after other desired additives, such as vitamin and iron components, malt, wheat germ, etc. have been mixed therewith. The normal water content (about 13–14%) of the farina, plus the agitation which goes on during the addition of the surface active hydratable protein material, results in the protein additive being smoothly dispersed throughout, and uniformly coated upon, the farina particles, when the protein material is added within its preferred range of about 1 to 2½% by weight of the total mixture; the farina being figured on an "as is" basis, with a moisture content of about 13–14% as it is customarily received in the plant and prior to sterilizing and packaging. However, when the surface active hydratable protein material is to be added in larger proportions, for example above 2½% and up to about 20%, it may be desirable preliminarily to increase the moisture content of the farina to ensure uniform coating and dispersion of the protein additive and to minimize the possibility of settling out from the final product. This preliminary increase in moisture content can be accomplished in any conventional manner (for example by steaming the farina with agitation). Where increased moisture content is desirable preliminary to the incorporation of the protein additive, it is possible, instead of moistening the whole batch of cereal, to add water to only a fraction of the cereal, then incorporate the protein additive into the moistened fraction with agitation, and finally mix the aforesaid fraction thoroughly into the main portion of the batch; this procedure having the advantage of reducing the amount of water which has to be added, and which has to be removed prior to packaging.

After incorporation of the protein material, the mixture is sterilized in conventional manner (for example using a conventional revolving drum drier); the heating time and temperature being regulated to give the final product a moisture content of about 10%. Where water has been added preliminary to protein incorporation, this extra water is eliminated by appropriate adjustment of the heating time and temperature, so that the final product still ends up with a moisture content of about 10%.

Nutritive and flavoring additives, such as vitamins, iron compounds, malt, wheat germ, etc., have no appreciable effect upon the quick-cooking action of the surface active hydratable proteins.

The farina type cereal of the present invention is prepared for consumption in the following manner.

2 cups of water (about 475 ml.) containing a small amount (about ½ teaspoon) of salt, is brought to a full boil in a sauce pan or the like and to it is added, slowly and with stirring, about 100 grams of the cereal. The mixture is then brought back to a boil, removed from the source of heat, and stirred for about 30 seconds, whereupon it is ready for serving; the taste, flavor, consistency, mouth feel, and other organoleptic properties reasonably approximating those of ordinary farina which has been slow-cooked in the manner described below. However, instead of having the cereal served immediately after the 30 second stirring period, it is possible to permit it to stand, in a covered pan, for an additional period of time extending up to about 5 minutes. We have found that, during this standing period (during which no stirring is needed), a progressive self-cooking action takes place, resulting in even more thorough cooking and further improved organoleptic properties.

By way of contrast, conventional farina of the same type (that is, produced from the same grain, in the same manner, and with the same fortifying and flavor-producing constituents, but without the surface active hydratable protein constituent) requires considerably longer cooking time and substantially more water, as shown by the following example. 3 cups of water (about 713 ml.) containing about ¾ teaspoon of salt is brought to a full boil and to it is added 100 grams of the farina, with vigorous stirring and at a rate sufficiently slow that boiling does not stop. Cooking is continued, over low heat, for at least 3 minutes, with continued vigorous stirring before the cereal is ready to serve. Where a double boiler is employed, 7 minutes of cooking, with continued stirring, is required.

From the foregoing, two marked advantages are readily apparent in the use of the novel quick-cooking cereal of this invention.

First, there is the marked reduction in cooking and stirring time required. Thus, the housewife, if she is very pressed for time, need only add the cereal to boiling water, bring the mixture back to a boil, stir for a few seconds, and serve. Or, if she wishes to take advantage of the self-cooking action of our cereal, she can devote herself to other duties for the few minutes during which the cereal is standing unattended in a covered pan. By comparison, the prolonged cooking and stirring time required for conventional slow-cooking farina constitutes a tedious and unpleasant chore.

Second, there is the substantial reduction in the quantity of water required for cooking a given weight of cereal. In the foregoing illustrations, conventional slow-cooking cereal requires 3 cups of water for 100 grams of the farina, whereas the novel quick-cooked farina type cereal of this invention requires only 2 cups of water for the same amount of cereal. Indeed, we have found that as little as 1½ cups of water can be used satisfactorily to cook 100 grams of our cereal, so that there is a reduction of one-third to one-half in the amount of water needed, as compared to that required for conventional slow-cooking farina. This reduction in the amount of water needed is important especially for consumers who prefer the taste and mouth feel of a thick cereal or who like to add large quantities of milk or cream after cooking. Additionally, of course, it takes twice as long to bring 3 cups to a boil, as it does with 1½ cups, so that a further reduction in the overall preparation time is effected, as compared to conventional slow-cooking farina.

Of course, milk can be used in place of water in quick-cooking the novel farina type cereal of this invention, in accordance with the preference of some consumers, and here the marked reduction in cooking time provides another advantage since it is well known that the longer milk is cooked the greater the change in its taste and the greater the risk of scorching.

We have found that the surface active hydratable protein materials of the present invention, specifically vital gluten, vital glutenin, milk solids, soybean flour and hydratable casein salts such as sodium caseinate, act in a singularly effective manner in reducing cooking time needed to produce a palatable farina type cereal. By way of contrast, such closely analogous materials as devitalized gluten, devitalized glutenin and the gliadin fraction of gluten are comparatively much less effective.

While it is not essential to an understanding of the present invention to explain the way in which the surface active hydratable protein materials operate in reducing the cooking time required for farina type cereals, we believe, on the basis of present knowledge and without being bound thereby, that the manner of operation may be as follows. The surface active hydratable protein materials apparently function to permit more rapid surface adsorption on, and subsequent penetration into, the farina particles of the hot water molecules, thus making the cooking process more rapid. While this is going on, the additive protein material forms a loose smooth film on the surface of the farina particle which has the smooth mouth feel and other organoleptic properties customarily associated with a cooked conventional farina cereal, even though the final product may perhaps be somewhat less fully cooked (by the standards of extent of gelatinization plus hydration and/or denaturation, as referred to above) as the conventional slow-cooked farina. In addition, a somewhat gelatinous interphase develops, due probably to hydration of the additive protein particles and also to at least a partial gelatinization of the starch within the farina particles.

The following are illustrative examples of our novel quick-cooking farina type cereal and its method of production.

*Example 1*

A farina cereal, which has been made from wheat by conventional dry milling operations, and into which has been incorporated a minor proportion of suitable nutritive and flavoring ingredients, as for example vitamins, iron-containing compounds, malt, etc., and which has a moisture content of about 13–14% by weight, is agitated and to it is added vital gluten, in amount sufficient to constitute about 1.5% by weight of the total mixture; the agitation being continued until there is uniform dispersion. The mixture is then sterilized in conventional manner (for example by passing it through a conventional rotating drum drier); the heating time and temperature being so regulated during sterilization that about 3–4% of the moisture is removed during this operation, leaving the final product with a moisture content of about 10%, whereupon it is ready for packaging. In use, about 100 grams of the cereal is added, slowly and with stirring, to 2 cups (about 475 ml.) of water containing about ½ teaspoon of salt, which has first been brought to a full boil. After addition of the cereal has been completed, the mixture is again brought to a full boil, removed from the source of heat, and stirred for about 30 seconds. The cereal is then ready for immediate serving, although optionally it can be allowed to stand, without stirring, in a covered pan, for up to about 5 minutes, so as to take advantage of its self-cooking action which automatically increases digestibility. Milk or cream, sugar and/or butter may be added according to the tastes of individual consumers. The product was fully comparable to ordinary slow-cooked farina in appearance, flavor, consistency, mouth feel, and other organoleptic properties. There was a marked reduction in tendency to scorch, lump and adhere to the sauce pan, plus a substantial reduction in cooking time and water required. Satisfactory results were also obtained when the procedure was repeated with varying proportions of vital gluten ranging from about 1% to about 2½%; and likewise when the cooking procedure was repeated with varying amounts of salted water ranging from about 1½ to 2½ cups.

Example 1-A

The procedure of Example 1 was repeated except that the moisture content of the farina was increased about another 3% (for example by steaming with vigorous agitation) prior to incorporation of the vital gluten, which was added, with stirring, in sufficient amount to constitute about 15% of the total mixture (calculated on the original 13-14% moisture content and excluding the added water). The mixture was then sterilized, with regulation of the heating time and temperature so that the final product had a moisture content of about 10%. The maner of use and the results were, in all respects, comparable and satisfactory. When the procedure was repeated with proportions of vital gluten ranging from about 3% to about 20% fully comparable and satisfactory results were obtained. Of course, with relatively lower proportions of vital gluten, lesser amounts (for example 1% added water for up to about 5% vital gluten) are needed. Conversely, when the vital gluten approaches its maximum of about 20%, it may be desirable to increase the amount of added water (for example to about 4-5%). Of course, in all cases, the amount of added water should be no larger than is necessary to ensure uniform dispersion and coating of the protein material on the cereal particles, since extra water unnecessarily adds to the drying time and expense.

Example 1-B

The procedure of Example 1 was again repeated except that a fraction (for example one-tenth) of the total batch of farina was separately treated (for example by steaming with agitation) to increase its moisture content by about another 2%. About 10% of vital gluten (calculated on the total mixture with the entire batch of farina, but with the added water excluded) was then added to the moistened fraction, slowly and with vigorous agitation; the agitation being continued until the vital gluten was uniformly dispersed throughout, and coated upon, the farina particles of the moistened fraction. The fraction was then dried (for example at about 200° F. for about one-half hour) and thoroughly mixed into the remainder of the batch, with agitation, until uniformly dispersed throughout. The mixture was thereafter sterilized; the heating time and temperature again being regulated to give the final product a moisture content of about 10%. The manner of use and the results were, in all respects, comparable to those of Example 1 and were satisfactory. The procedure was repeated using varying proportions of vital gluten ranging from about 3% to about 20%, using varying batch fractions ranging from about 2% to about 25%, with varying amounts of added water ranging from about 1% to about 7% in the batch fraction, and, in all instances, the results were satisfactory.

Example 2

All the variations of Examples 1, 1-A and 1-B were repeated using vital glutenin in place of vital gluten. The results were, in all respects, comparable and satisfactory.

Example 3

The procedure of Example 1 was repeated but substituting 1% of sodium caseinate for the vital gluten. The results were comparable and satisfactory.

Example 4

The procedures of Examples 1, 1-A and 1-B were repeated but substituting sodium caseinate for the vital gluten. The results were, in all respects, comparable and satisfactory.

Example 5

The procedues of Examples 1, 1-A and 1-B were repeated but substituting soybean flour for the vital gluten. Again, the results were comparable and satisfactory.

Example 6

The procedures of Examples 1, 1-A and 1-B were repeated but substituting, for the vital gluten, an equal-part mixture of soybean flour and vital gluten. Here too the results were comparable and satisfactory.

As used herein, the term "vital" as applied to gluten or glutenin designates a surface active material capable of being hydrated; as distinguished from "devitalized" gluten or glutenin which is incapable of being hydrated.

The present invention may be embodied in other specific forms without departing from the spirit or essential attributes thereof and, accordingly, the foregoing embodiments are to be considered in all respects merely as illustrative and not restrictive; reference being made to the appended claims as indicating the scope of this invention.

Having thus described our invention, we claim as new and desire to protect by Letters Patent the following:

1. A quick-cooking cereal product comprising a major proportion of wheat farina having a moisture content of below about fourteen percent by weight, and about one to twenty percent by weight of a surface active hydratable protein material made up of at least one member of the group consisting of vital gluten, vital glutenin, milk solids, soybean flour, and hydratable casein salts.

2. A cereal product in accordance with claim 1 in which the concentration of the surface active hydratable protein material is between one to two and a half weight percent.

3. A cereal product in accordance with claim 1 wherein the surface active hydratable protein material consists of vital gluten.

4. A cereal product in accordance with claim 1 in which the surface active hydratable protein material consists of vital glutenin.

5. A cereal product in accordance with claim 1 in which the surface active hydratable protein material consists of milk solids.

6. A cereal product in accordance with claim 1 in which the surface active hydratable protein material consists of soybean flour.

7. A cereal product in accordance with claim 1 in which the surface active hydratable protein material consists of hydratable casein salts.

8. A method of forming a quick-cooking cereal product comprising the steps of forming a dry-milled wheat farina and which has a moisture content of below about fourteen percent by weight, and adding to said farina with agitation about one to twenty percent by weight of a surface active hydratable protein material made up of at least one member of the group consisting of vital gluten, vital glutenin, milk solids, soybean flour, and hydratable casein salts.

9. A method in accordance with claim 8 in which the concentration of the surface active hydratable protein material is between one to two and a half weight percent.

10. A method in accordance with claim 8 wherein the surface active hydratable protein material consists of vital gluten.

11. A method in accordance with claim 8 in which the surface active hydratable protein material consists of vital glutenin.

12. A method in accordance with claim 8 in which the surface active hydratable protein material consists of milk solids.

13. A method in accordance with claim 8 in which the surface active hydratable protein material consists of soybean flour.

14. A method in accordance with claim 8 in which the surface active hydratable protein material consists of hydratable casein salts.

References Cited in the file of this patent

UNITED STATES PATENTS

| 1,125,692 | Kitchen | Jan. 19, 1915 |
| 1,127,778 | Kitchen | Feb. 9, 1915 |
| 2,727,822 | Kimball et al. | Dec. 20, 1955 |

FOREIGN PATENTS

| 385,200 | Great Britain | Dec. 22, 1932 |
| 489,127 | Great Britain | July 20, 1938 |
| 619,220 | Great Britain | Mar. 7, 1949 |

OTHER REFERENCES

"The Encyclopedia of Food," 1923, by Ward, published by A. Ward (N.Y.) page 190.